United States Patent
Ali-Tolppa et al.

(10) Patent No.: US 10,225,371 B2
(45) Date of Patent: Mar. 5, 2019

(54) METHOD AND NETWORK COMPONENTS AND SELF-ORGANIZING NETWORK

(71) Applicant: NOKIA SOLUTIONS AND NETWORKS OY, Espoo (FI)

(72) Inventors: Janne Tapio Ali-Tolppa, Taufkirchen (DE); Tsvetko Ivanchev Tsvetkov, Garching (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 3 days.

(21) Appl. No.: 15/345,000

(22) Filed: Nov. 7, 2016

(65) Prior Publication Data

US 2017/0134524 A1    May 11, 2017

(30) Foreign Application Priority Data

Nov. 6, 2015 (EP) .................................... 15193511

(51) Int. Cl.
*H04L 29/08* (2006.01)
*H04W 24/02* (2009.01)
*H04W 84/18* (2009.01)

(52) U.S. Cl.
CPC ............. *H04L 67/34* (2013.01); *H04W 24/02* (2013.01); *H04W 84/18* (2013.01)

(58) Field of Classification Search
CPC ........ H04L 67/36; H04W 24/02; H04W 84/18
See application file for complete search history.

(56) References Cited

U.S. PATENT DOCUMENTS 6,101,610 A * 8/2000 Beebe .................... G06F 1/206
    713/323
7,307,954 B1 * 12/2007 Strandberg ............. H04L 45/00
    370/229

(Continued)

FOREIGN PATENT DOCUMENTS

| WO | 2015/165525 A1 | 11/2015 |
| WO | 2016/037637 A1 | 3/2016 |
| WO | 2016/146192 A1 | 9/2016 |

OTHER PUBLICATIONS

3GPP TS 32.450 V12.0.0 (Oct. 2014); 3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 12), pp. 1-17.

(Continued)

*Primary Examiner* — Steven H Nguyen
(74) *Attorney, Agent, or Firm* — Squire Patton Boggs (US) LLP (57) ABSTRACT

It is proposed a method for verifying configuration changes in a Self-Organizing Network comprising a plurality of verification areas, in which each verification areas at least one network element is installed. The method comprises observing 701 a configuration change within a verification area affecting one or more network elements; computing 702 a virtual temperature value for the affected network elements, wherein the virtual temperature value indicates a stability state of the network element; distributing 703 the computed virtual temperature value; receiving 703 the computed virtual temperature value; triggering 704 a verification mechanism 500; and evaluating 705 the virtual temperature value of the given verification area.

15 Claims, 8 Drawing Sheets

(56) References Cited

U.S. PATENT DOCUMENTS

| | | | |
|---|---|---|---|
| 9,626,238 B2* | 4/2017 | Sheynblat | G06F 9/542 |
| 2004/0058657 A1* | 3/2004 | Ziren | H03J 7/04 |
| | | | 455/192.2 |
| 2008/0056261 A1* | 3/2008 | Osborn | H04L 12/2834 |
| | | | 370/392 |
| 2010/0020847 A1* | 1/2010 | Weizman | G01K 7/34 |
| | | | 374/163 |
| 2010/0094582 A1* | 4/2010 | Cox | G01K 7/42 |
| | | | 702/130 |
| 2011/0301778 A1* | 12/2011 | Liang | G05D 23/1932 |
| | | | 700/299 |
| 2012/0135697 A1* | 5/2012 | Park | H03G 3/3042 |
| | | | 455/127.2 |
| 2012/0252440 A1 | 10/2012 | Watanabe | |
| 2014/0149064 A1* | 5/2014 | Davidson | G06F 15/00 |
| | | | 702/130 |
| 2014/0303804 A1* | 10/2014 | Priel | G05D 23/1917 |
| | | | 700/299 |
| 2017/0134524 A1* | 5/2017 | Ali-Tolppa | H04L 67/34 |
| 2017/0302580 A1* | 10/2017 | Luo | H04L 43/0876 |

OTHER PUBLICATIONS

Sujuan Feng et al; Self-Organizing Networks (SON) in 3GPP Long Term Evolution; 2008; XP007907980, Nomor Research GmbH, Munich, Germany, May 20, 2008, 16 pages.

Tsvetko Tsvetkov et al; A Configuration Management Assessment Method for SON Verification; In International Workshop on Self-Organizing Networks (IWSON), IEEE 2014, pp. 380-384.

Borislava Gajic et al; An Improved Anomaly Detection in Mobile Networks by Using Incremental Time-aware Clustering; IFIP/IEEE Workshop on Cognitive Network and Service Management (Cog-Man 2015), pp. 1286-1291.

J. MacQueen; Some Methods for Classification and Analysis of Multivariate Observations; Proceedings of the Fifth Berkeley Symposium on Mathematical Statistics and Probabillity, vol. 1, 1967, pp. 281-297.

Sascha Berger et al; Comparing Online and Offline SON Solutions for Concurrent Capacity and Coverage Optimization; Vehicular Technology Conference (VTC Fall), IEEE 2014, pp. 1-6.

Tsvetko Tsvetkov et al; A Graph Coloring Approach for Scheduling Undo Actions in Self-Organizing Networks; IFIP/IEEE International Symposium on Integrated Network Management (IM 2015), May 2015, pp. 1-9.

Ericsson; Transparent Network-Performance Verification for LTE Rollouts; White Paper, Sep. 2012, pp. 1-12.

A Deliverable by the NGMN Alliance: NGMN 5G White Paper, Feb. 2015, final deliverable, Version 1.0, pp. 1-125.

Seppo Hamalainen et al; LTE Self-Organising Networks (SON): Network Management Automation for Operational Efficiency; Wiley 2012, pp. 1-43.

Ericsson; 5G: What is it?; More than just improved Performance and Greater Flexibility, the next Generation is a shift in mindset; White Paper, Oct. 2014, pp. 1-10.

Teuvo Kohonen; Self-Organized Formation of Topologically Correct Feature Maps; Biological Cybernetics, Springer Verlag 1982, pp. 1-11.

Nokia; 5G Use Cases and Requirements; White Paper, Nov. 2014, pp. 1-12.

Harold Szu; Fast Simulated Annealing; Physics Letters A, vol. 122, 1987, pp. 1-6.

European Search Report application No. 15193511.1 dated May 13, 2016.

Korean Office Action application No. 10-2016-0146736 dated Nov. 28, 2018.

* cited by examiner

METHOD AND NETWORK COMPONENTS AND SELF-ORGANIZING NETWORK

TECHNICAL FIELD

The present invention relates to a method for verifying configuration changes in a Self-Organizing Network and to network components and to a Self-Organizing Network.

BACKGROUND

The continuous increase in demand for a better mobile communication service is encouraging research and industry to define new network design principles so that the future need on performance, capacity, and reliability can be met. For this reason, the Next Generation Mobile Networks (NGMN) alliance has envisioned the fifth generation of mobile communications (5G) with the purpose of reaching a much higher throughput, lower latency, ultra-high reliability, higher connectivity, and higher user mobility. This new upcoming release, however, is not only about the development of a new radio interface, but also to enable the operation in a highly heterogeneous environment. Such an environment is typically characterized by the presence of multi-layer networks, different types of access technologies, as well as a high number of small cells densely clustered together, thereby, giving a contiguous coverage. Furthermore, a 5G network should at the same time enable a high network availability and reliability as well as guarantee certain services for critical infrastructures.

The Self-Organizing Networks (SON) concept as known today, which basically allows base stations to automatically configure themselves, will be much further developed in 5G systems. Advanced SON techniques will not only apply to physical Network Elements (NEs), but will enable operators to, for instance, balance load in a multi-radio-access technology environment, and support traffic steering as well as dynamic spectrum allocation.

SON features may be designed to optimize the operation of the network, supervise the configuration and auto-connectivity of newly deployed NEs, and are also responsible for fault detection and resolution. Such a network is may be managed by a set of autonomous functions performing specific network management tasks. These SON functions may be designed as control loops which may monitor Performance Management (PM) and Fault Management (FM) data, and based on their goals, to adjust Configuration Management (CM) parameters.

Despite the development of SON, there may be a need to verify the performance impact of deployed CM changes after a reconfiguration has taken place. Therefore, the concept of SON verification has been developed. It may be seen as a special type of anomaly detection that implements a verification process. The outcome of the process is to accept deployed CM changes or to revert them to a previous stable state, which is also known as a CM undo request. The verification process itself operates in three phases. At first, it divides the network into verification areas according to the CM changes. Second, it runs an anomaly detection algorithm for each area. Third, it marks the changes for an undo that are most likely responsible for causing a degradation. Finally, it schedules CM undo requests for deployment.

Despite the process SON verification has made progress, it still has shortcomings in Long Term Evolution (LTE) as well the 5G release. In particular, a verification mechanism can experience difficulties in detecting anomalies and executing undo requests in case it is improperly timed. A too short observation may result in the generation of false positives which may hinder the active SON function from reaching the global performance optimum. For example, a function may induce a temporal performance decrease which can rolled back, i.e., the verification mechanism may interrupt the function while it tries to achieve its optimization goal.

SUMMARY OF THE INVENTION

There is provided a method for verifying configuration changes in a Self-Organizing Network comprising a plurality of verification areas, in which each verification areas at least one network element is installed. The method comprising observing a configuration change within a verification area affecting one or more network elements; computing a virtual temperature value (NEVT) for the affected network elements, wherein the virtual temperature value indicates a stability state of the network element; distributing the computed virtual temperature value; receiving the computed virtual temperature value; triggering a verification mechanism and evaluating the virtual temperature value of the given verification area.

A a configuration change may be a configuration management (CM) change. Moreover, adapting the virtual temperature value at least at one network element may be by performed by dynamically configuring the virtual temperature value.

Moreover, the method may further comprise providing a decision based on the evaluated virtual temperature value.

In addition the method may further comprise that decision based on the evaluated virtual temperature value may be one decision out of the following group of decisions comprising to accept the verified changes, to reject the changes and to continue monitoring. A continuation of monitoring may be initiated by timely extending an observation window. By timely extending an observation window the time length of the window may be adapted.

Furthermore, the method may further comprise that distributing the computed virtual temperature value comprises to providing a forward message.

Moreover, the method may further comprise evaluating the virtual temperature value of the given verification area comprises exchanging information by issuing a get message and replying with an info message.

Moreover, there is provided a first network component to be installed in a Self-Organizing Network comprising one or more processors; and one or more memories including computer program code, wherein the one or more memories and the computer program code configured, with the one or more processors, to cause the apparatus to perform: observing a configuration; change within a verification area affecting one or more network elements; computing a virtual temperature value for the affected network elements, wherein the virtual temperature value indicates a stability state of the network element; distributing the computed virtual temperature value; evaluating the virtual temperature value of the given verification area. The first network component may be a NEVT aggregator.

Furthermore, the first network component may further comprise an event monitor entity adapted to monitor the observation change as an event; a calculation entity adapted to compute a virtual temperature value for the affected network elements; and a distribution entity adapted to distribute information relating to the calculated virtual temperature value.

Thus, the first network may receive and send information in relation to the virtual temperature value. The event monitor entity may receive an activity message from another network component, such as a NEVT parser.

Moreover the first network component may be connected to one or more further network components comprising at least the same characteristics like the first network component. This means that a plurality of first network elements, such as a NEVT aggregator, may be connected to each other for the exchange of information, which may be provided by messages, such as forward messages or info messages.

Furthermore, as an exemplary embodiment the first the network component may be adapted to receive and send forward messages.

In addition, the first network component may be connected to a history database, from which the network component receives information.

There is provided a second network component to be installed in a Self-Organizing Network comprising one or more processors; and one or more memories including computer program code, for receiving a computed virtual temperature value and for triggering a verification mechanism. The second network component may be a NEVT parser. Moreover, the second network component may be connected with a SON verification function in order to coordinate actions.

Moreover, according to an exemplary embodiment of the present invention the second network component may be adapted to request information from a further network component by sending a get message. The further network component may be a NEVT aggregator. The second network component may be able to collect the virtual temperature value of the network elements and may afterwards evaluate the virtual temperature value of the verification area Moreover, the second network component may be adapted to allow a verification mechanism to read a current virtual temperature value.

Further there may be provided a Self-Organizing Network comprising a first network component according to the present invention and a second network component according to the present invention, wherein the first network component and the second network component may be adapted to exchange information over an interface which is common to the first and second component. It would be in the scope of the present invention to integrate the first and the second network component in one single entity.

Moreover, according to an exemplary embodiment of the Self-Organizing Network there may be foreseen that the second network component is adapted to send an activity message to the first network component. Moreover, it may be foreseen that the first network component is adapted to send an info message to the second network component. And moreover, it may be foreseen that the second network component is adapted to send a get message to the first network component.

In this context an "optimization" aims to optimize the verification decisions, i.e., which configuration changes are accepted in the network and which are rolled back. Optimization may include also optimizing the observation time, i.e., finding the optimal time period that needs to be monitored after a change for making the verification decision.

In this context "Network Element Virtual Temperature (NEVT)" may be understood as a representation of the state of stability of the network element. Moreover, the stability of a cell may be defined as a "Cell Virtual Temperature (CVT)". Recent configuration changes and changes in the network performance may increase the NEVT/CVT. Furthermore, in this context the terms "virtual temperature" or "virtual temperature value" or the "temperature" are equally used. The temperature may also be distributed between neighboring NEs. Moreover, the temperature may be represented as an integer, for example, in the range from 0 to 100, wherein "0" being the coldest and "100" the hottest temperature.

A "verification area" may be comprised of the reconfigured cell, also called the "target cell", and a target extension set that may include the possibly impacted cells by a change. One possible approach to compute such areas may be to consider the neighbor relations between the cells, e.g., by taking the reconfigured cell and all of its direct neighbors. Another approach may be to directly observe the impact areas of the SON functions that have been recently active in the network. In addition, the selection of the cells that are being under observation may depend on their location, e.g., areas of dense traffic and known trouble spots.

An "anomaly" may be understood as something that significantly deviates from what would be typically expected. In this content the focus lies on detecting abnormal behavior of a cell, i.e., the performance of a cell has notably degraded. This may be done by analyzing the network performance indicators and finding all realizations of the normal network operation. Once the network performance considerably differs from all learned realizations of the normal network operation, the anomaly may be detected and corresponding corrective actions may be taken.

In this context "SON verification" may refer to the concept of the automated verification of network performance, which is implemented by the "SON verification function" or "SON verification mechanism, and these terms may be used interchangeably.

Preferably the SON solutions described in this context are online SON solutions, in particular one or more SON functions may run online in a live network.

BRIEF DESCRIPTION OF THE DRAWINGS

In the drawings exemplary embodiments in relation to the present invention as well as optional features are illustrated.

DETAILED DESCRIPTION OF THE DRAWINGS

A SON verification mechanism may be seen as a special type of anomaly detection that implements a "verification process". The outcome may be to either accept deployed CM changes or to revert all or some of them to a previous stable state, which is referred to as a CM undo request.

Figure 1:
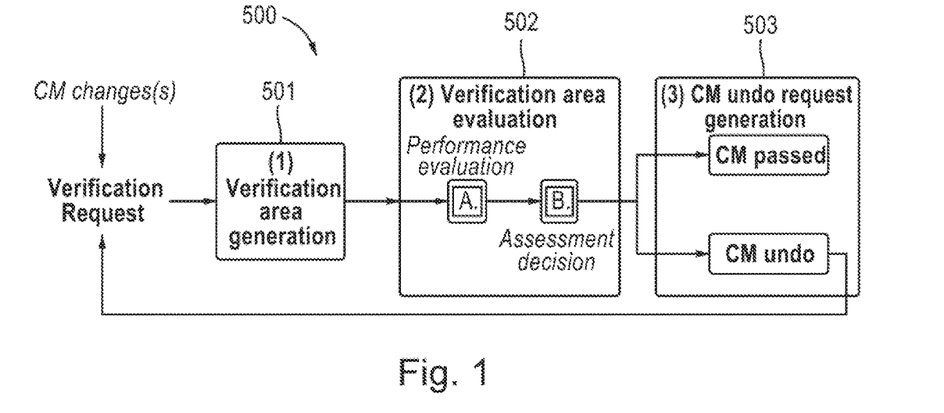
FIG. 1 an exemplary overview of a verification process.

An exemplary embodiment of a verification process 500, which may operate in three phases, which are shown as an exemplary embodiment in FIG. 1:

The first phase, as indicated by 501, the verification process divides the network into verification areas according to the CM changes.

The second phase, as indicated by 502, the verification process runs an anomaly detection algorithm for each area.

The third phase, as indicated by 503, the verification process marks the changes for an undo that are most likely responsible for causing an abnormal behavior. Finally, the verification process schedules CM undo requests for deployment.

In case of a degraded area, an undo request may be generated. Such a message may comprise three data fields: one that uniquely identifies the target cell in the network, another which comprises the identifiers of the impacted cells, and a third field that includes a list of CM parameter values for the target cell. The CM parameter value list may be a complete or partial snapshot of the CM settings a cell has had.

SON verification has shortcomings regarding to 5G technology and, in particular, small cell scenarios. A network comprised of such cells may typically have high-density areas, having the purpose to deliver a high amount of data capacity. However, executing undo requests in such areas could be a challenging task as there could be more verification areas to assess, more cells to verify and potentially more changes to undo. Consequently, a verification mechanism may start experiencing difficulties as the mechanism tries to identify, which CM undo requests to possibly execute, which to possibly omit, and which to possibly delay.

Figure 2:
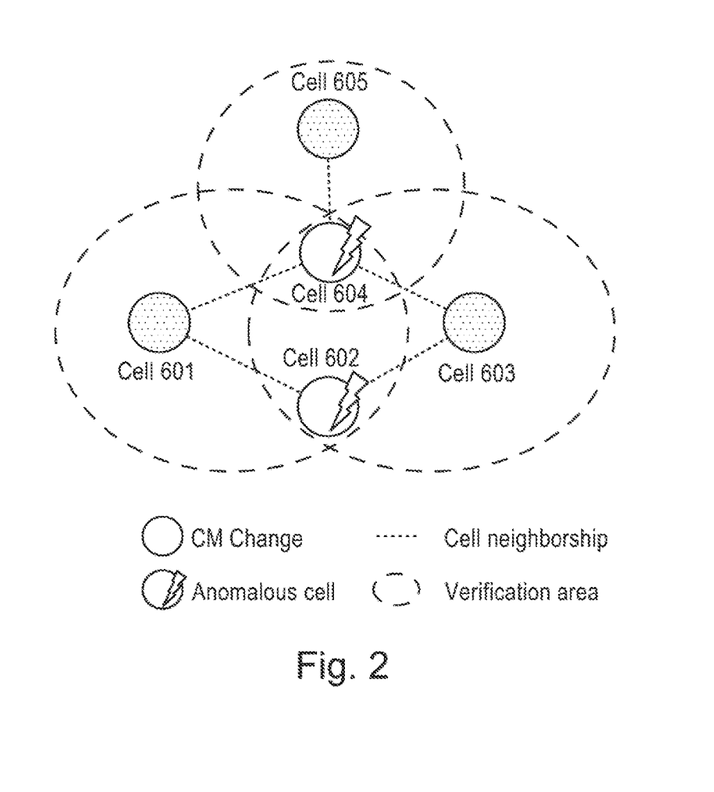
FIG. 2 an example of overlapping areas leading to verification collisions.

In an exemplary embodiment as shown in FIG. 2 there are five cells present, indicated as 601, 602, 603, 604 and 605. The neighbors of cell 601 as well as cell 603 are cell 602 and cell 604, and the neighbor of cell 605 is cell 604. For simplicity reasons, it is assumed that a single CM parameter has been changed within the cells 601, 603 and 605. In the example it is assumed that a single CM parameter has been changed within cells 601, 603, and 605. When computing the verification area by taking the reconfigured cell and the direct neighbors, and cells 602 and 604 degrade, there will be three overlapping verification areas. The question that arises in such a situation is how to handle those overlaps, i.e., which cells should perform an undo at first and in which cell can the undo be possibly delayed.

Those overlaps are referred to as "verification collisions", as exemplary indicated in FIG. 2. A collision may occur when at least two verification areas share anomalous cells, i.e., the corresponding two undo requests impact two overlapping sets of cells.

A drop in performance may not necessarily mean that there is an obligation to immediately undo the given changes. One reason is that several functions may require not only one step, but several steps during which they observe whether they have moved more closely towards achieving their goal. By doing so, such functions may induce a transient performance decrease in the network. For instance, in Long Term Evolution (LTE) technology a Coverage and Capacity Optimization (CCO) function may monitor the impact of its last deployed antenna tilt or transmission power changes, and may adjust them if required.

A verification mechanism may observe verification areas for a fixed period of time, also called an "observation window". During this time frame the verification mechanism may assess the performance of the cells within the areas and may generate CM undo messages if the performance has significantly decreased. The problem with this approach is that a transient performance may decrease during the observation window results in a generation of one or more undo requests. In other words, such an approach may fail to find a better network configuration, even when such exists.

Furthermore, in a denser and more dynamic future 5G cognitive network such a static approach may not work well. Every time a CM undo request is executed, other SON functions can potentially get active. For instance, if the request rolls back a transmission power change, a function like MRO (Mobility Robustness Optimization) may immediately try to adjust the mobility parameters. Consequently, such an activity will interfere which may prevent the verification process from achieving its goal. Theoretically, the impacted cells could be blocked for the required time for any optimization. However, this may be not applicable in a real network due to the size of the generated verification areas. Doing so in a 5G setup, the requirement for availability, reliability, and efficiency might be violated.

In summary, in the Self-Organizing Network there are suggested a Network Element Virtual Temperature (NEVT) aggregator and a NEVT parser. In the following, these entities or network components are explained in more detail. Moreover, it is explained how these components may interact with each other and how they could be integrated in a network.

NEVT Aggregator

Figure 3:
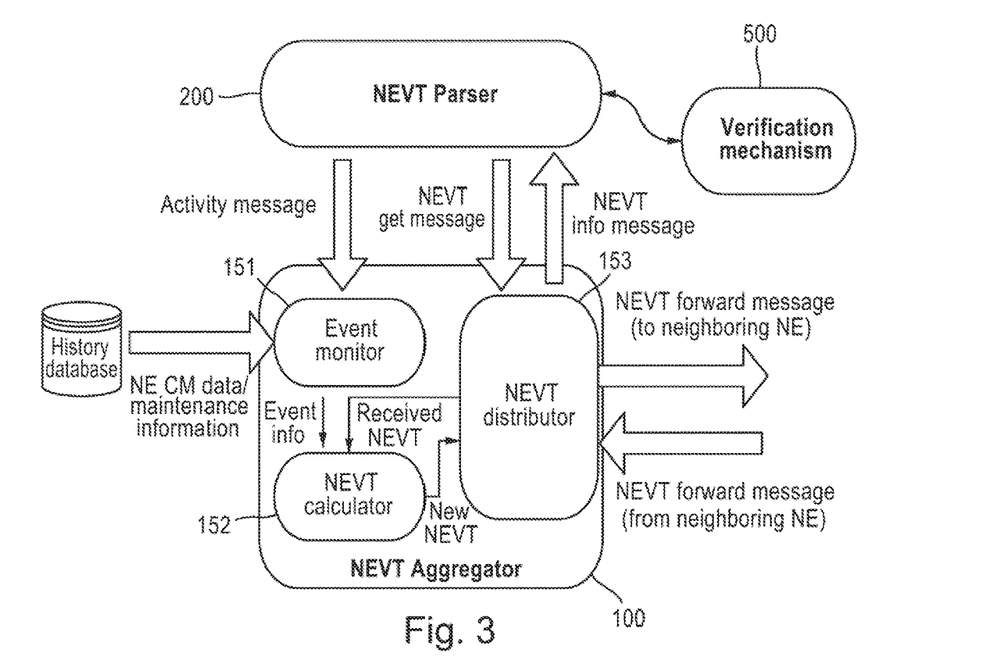
FIG. 3 an example for a NEVT parser in combination with a NEVT aggregator.

In FIG. 3 an exemplary embodiment of a NEVT aggregator 100 is illustrated. The NEVT aggregator 100 may be understood as a network component and may comprise one or more sub-components.

A first sub-component of the NEVT aggregator 100 may be an event monitor 151 which is responsible for monitoring the events occurring on the NE. Typical events are the change of CM parameters, software upgrades, etc.

A second component of the NEVT aggregator may be a NEVT calculator 152. In general, a "NEVT" shall be understood as an indicator of the stability of a NE (Network Element), using indications like "cold" and "hot". A NE which is marked as being "hot" (i.e., high NEVT value), should be seen as unstable, which consequently means it is more likely to accept intermediate optimization steps that lead to somewhat reduced performance, in order to reach improved performance in the future. On the other side, an NE that is labeled as "cold" (i.e., low NEVT value) has to be considered as mature and ready for verification. Such an element is unlikely to have further optimization steps that would lead to a better performance. Examples for becoming "hot" may be NE commissioning, SON function activity on the NE, or manual reconfiguration of the NE. Another example for becoming "hot" as a status may happen when NE software is upgraded, which inserts "new heat" into the NE to indicate the reduced stability of its state.

The NEVT calculator 152 itself may compute the temperature by making use of the following function, called Temperature Computation Function:

$Temp_{compute}(event, rate)$

The resulting NEVT value may depend on the "event" that has occurred in the network, i.e., a certain type of changes may result in a much higher increase of the temperature than others. In addition, resulting NEVT value may also depend on the "cooling rate" which specifies the temperature decrease speed. After executing the Temperature Computation Function, a NEVT is assigned to the NE.

A NEVT may receive different values which may indicate a different stability state. A certain number of NEs may be located nearby each other and each may have a different NEVT value that is higher than zero. Having an increased temperature, may not necessarily mean that a certain event has taken place directly on the NE. The increased temperature could be also caused by the heat distribution between NEs, which can be seen as an analogy to physics where metal pieces conduct heat from one to another. However, in this content "heat" and "temperature" are understood as a stability status, and have nothing in common with temperature measured in Celsius degree or Fahrenheit. The heat distribution may happen independently of a verification process and the area of heat distribution does not need to coincide with a verification area, although often it might overlap with one.

A third sub-component of the NEVT aggregator 100, called the "NEVT distributor" 153, may distribute temperature information. The NEVT distributor 153 may serve as a connection point and may be used to exchange NEVT values between other NEVT aggregators of neighboring NEs. Thus, the NEVT distributor 153 may generate and/or may send and/or may receive NEVT forward messages. Such a NEVT forward message may be structured as follows:

NEVT forward message
  $ID_{sender}$: the identifier of the sending entity.
  $temp_{sender}$: the current NEVT of the sending entity.
  $rate_{sender}$: the used cooling rate by the sending entity.

Upon receiving a NEVT forward message, the NEVT distributor 153 may delegate the received information to the NEVT calculator 152. The NEVT calculator 152 may make use of one or two functions of the following functions to update an NE's temperature:

$Temp_{update}(temp_{sender}, temp_{own}, rate_{own})$: updates the receiver NE's temperature based on its own NEVT, the received NEVT as well as the used cooling rate.
  $Rate_{update}(rate_{own}, rate_{sender})$: updates the cooling rate of the receiver NE by taking into account the cooling rate reported by the sender NE.

Figure 4:
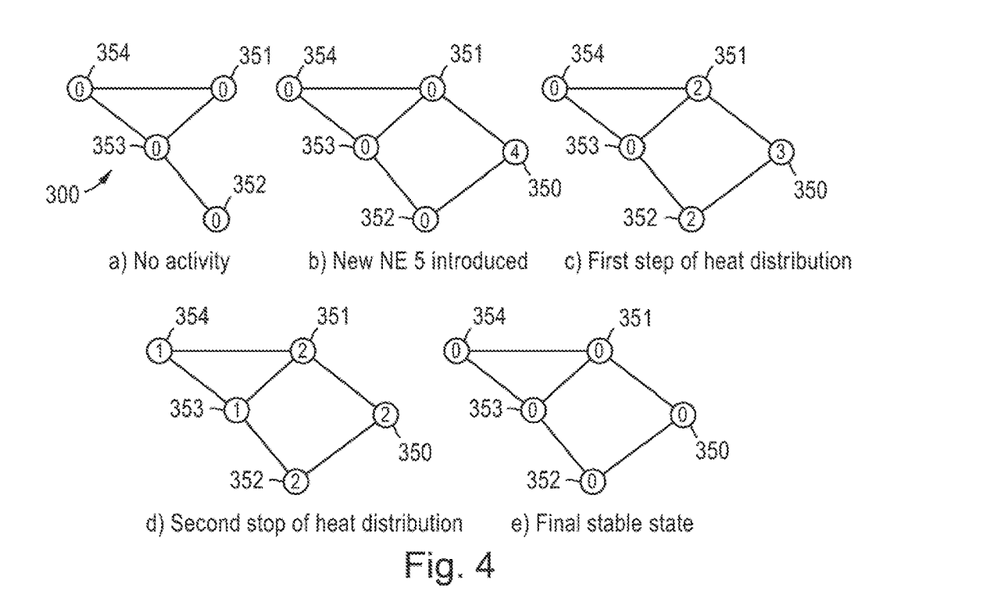
FIG. 4 an example for distributing NEVT.

In FIG. 4 an example is illustrated for distributing NEVT showing different states a) to e) in an existing network comprising a sub-network 300 comprising several NEs 351, 352, 353, 354. An introduction of a new NE 350 into the existing network 300 initiates a new event. As a result, the newly introduced NE 350 becomes "hot", as indicated by the high NEVT level of "4" compared to "0". Subsequently, the NE 350 may cool down as time passes and in case no further activity occurs. At the same time, the heat may be distributed in the neighboring NEs 351, 352, 553, 354, as indicated in states c) to d), which become "hotter" as well, until the sub-network 300 cools down again as shown in state e). More specific, the states are indicating the following situations: a) no activity, b) major reconfiguration, c) first step of heat distribution, d) second step of heat distribution and e) final stable state.

NEVT Parser

In FIG. 3 an exemplary embodiment of a NEVT parser 200 is illustrated. The NEVT parser 200 may be understood as a network component and may be connected to the NEVT aggregator 100.

The NEVT parser 200 may have the function of a connection point for a verification mechanism 500, see for example FIG. 1, or any other network anomaly analyzer to the NEVT aggregator 100. The NEVT parser 200 may allow a verification mechanism to read the current NEVT by requesting a "NEVT info message" from the NEVT aggregator 100. The request itself may be performed by sending a NEVT get message to the NEVT aggregator 100, which may have the following structure:

NEVT get message
  ID: the identifier of the entity whose NEVT value the verification mechanism is interested in.

The "NEVT info message", as generated by the NEVT aggregator 100, may have the following structure:

NEVT info message
  $ID_{sender}$: the identifier of the sending entity.
  $temp_{sender}$: the current NEVT of the sending entity.

Moreover, the NEVT parser 200 may provide to a verification mechanism the ability to inform a NEVT aggregator 100 about its planned undo activities. For example, if the verification mechanism 500 requires a certain period of time to resolve verification collisions, the NEVT aggregator 100 may artificially keep the temperature at a high level, indicating that the NEs have not stabilized. Such type of activities may be encapsulated in "activity messages", which may have the following structure:

Activity message
  $[ID_1, \ldots ID_n]$: the identifiers of the NEs, analyzed by the verification mechanism.
  Type: the type of activity (e.g., resolving verification collisions).

NEVT Usage for Verification

Upon receiving a NEVT info message, the NEVT parser 200 may trigger $eval(perf_{area}, temp_{area})$, where
  $perf_{area}$: Performance of a verification area (i.e., a set of NEs). The performance information is supplied by the verification mechanism, but can be also read from any present PM database.
  $temp_{area}$: The aggregated NEVT of a verification area (i.e., a set of NEs).

If $perf_{area}$ is positive, the verification area may not be further processed by a verification mechanism and the proposed changes may be accepted in the network. If $perf_{area}$ is negative, the decision of further processing may depend on how negative the performance is and on the temperature of the NE. If the performance is not much deviating from the expected behavior and if the NE is "hot", the verification area may be omitted. That is, even changes leading to small degradations can be accepted and not undone with the intent that the verified changes may lead into improved network performance later, when further optimizations are triggered by other SON functions.

Furthermore, based on information given by the NEVT parser 200, a verification mechanism 500 may decide to dynamically extend the observation window, meaning the verification mechanism decides neither to accept nor to reject the CM changes, but to extend the observation window and collect more performance data in case the current information is not sufficient for making a correct verification decision.

Figure 5:
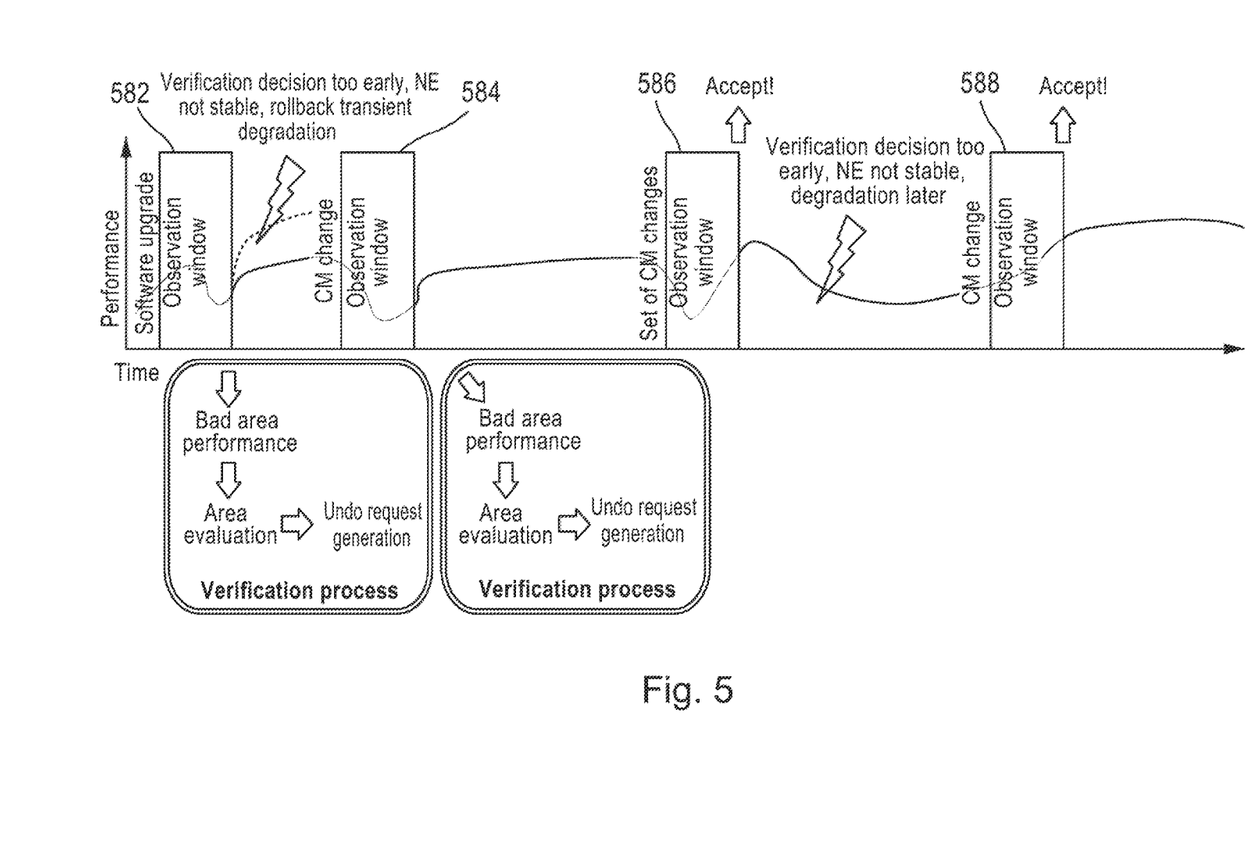
FIG. 5 an example of SON verification without the concept according to the present invention.

FIG. 5 illustrates an example of a SON verification mechanism without using the concept according to the present invention. In FIG. 5 shows a plurality of time-dependent observation windows 582, 584, 586, 588. SON functions may require not only one step, but several steps and may, therefore, get interrupted as they try to achieve their goal. This behavior can be seen in FIG. 5 in the first observation window 582. A verification area, i.e., a set of NEs, may not reach a global performance optimum in case there is a timely fixed observation window. This particular behavior can be seen in FIG. 5 in the first observation window 582. Moreover, using a fixed observation window may force a verification mechanism to take a decision to deploy an undo too early. This particular behavior can be seen in FIG. 5 in the third observation window 586.

Figure 6:
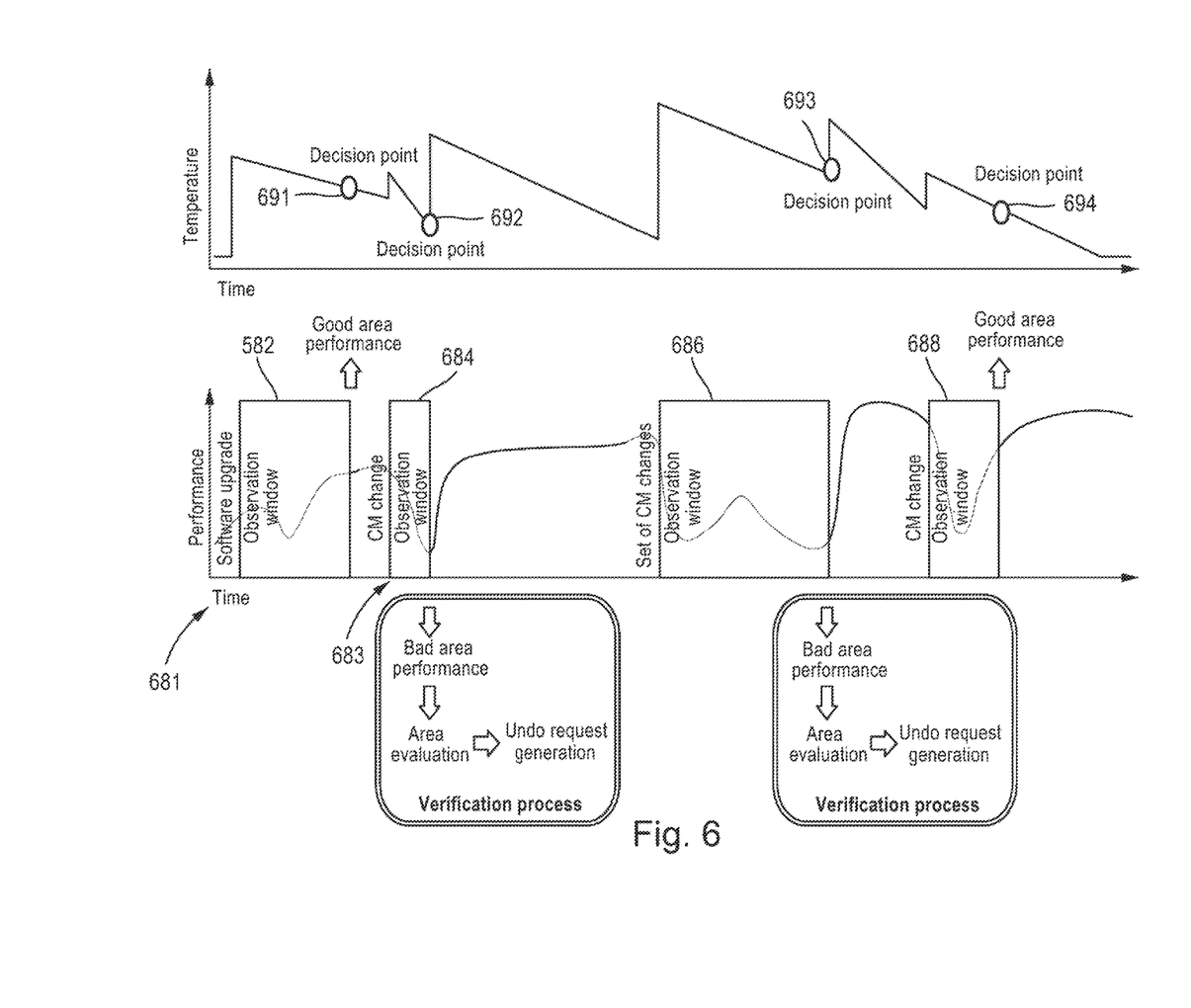
FIG. 6 an example for using NEVT information for adjusting a length of an observation window.

FIG. 6 shows an example of a dynamic observation window, presenting the NEVT of a verification area and its performance score on the same timeline. In the beginning there is a major change 681, in particular, a software upgrade, resulting in a NEVT increase of the verification area. Since an increase may be used as an indicator for being not ready for verification, the observation window 682 may be set to be longer. As soon as the temperature of the area falls below a certain threshold, as shown by the first decision point, the area may be assessed. In this example, the decision 691 is not to continue the verification process since the observations indicate good network performance after the changes under verification. Since there is no further major event, the area may continue to cool down. At a later point in time, a new event 683 may occur, which results in new heat being introduced. Since this was not a major change, the rate of decrease may be much faster, thus, resulting the observation window 684 to be shorter, which is indicated at a second decision point 692. Due to the fact that this activity was a bad change, there is generated an undo request, wherein an undo can also be seen as an event, resulting in an increase of the NEVT.

For the remaining two decision points 693, 694 a contrary situation may occur:
(1) a large set of inappropriate changes resulting in a long observation window 686, at the end of which there may be provided a decision to undo, and
(2) a rather small set of good changes resulting in a short observation window 688 and a decision to accept the changes.

The messages that may be exchanged between the verification entity, the NEVT parsers 200 and NEVT aggregators 100 can be provided as follows, wherein in FIG. 5 an exemplary overview of a third observation window 686 is given.

Figure 7:
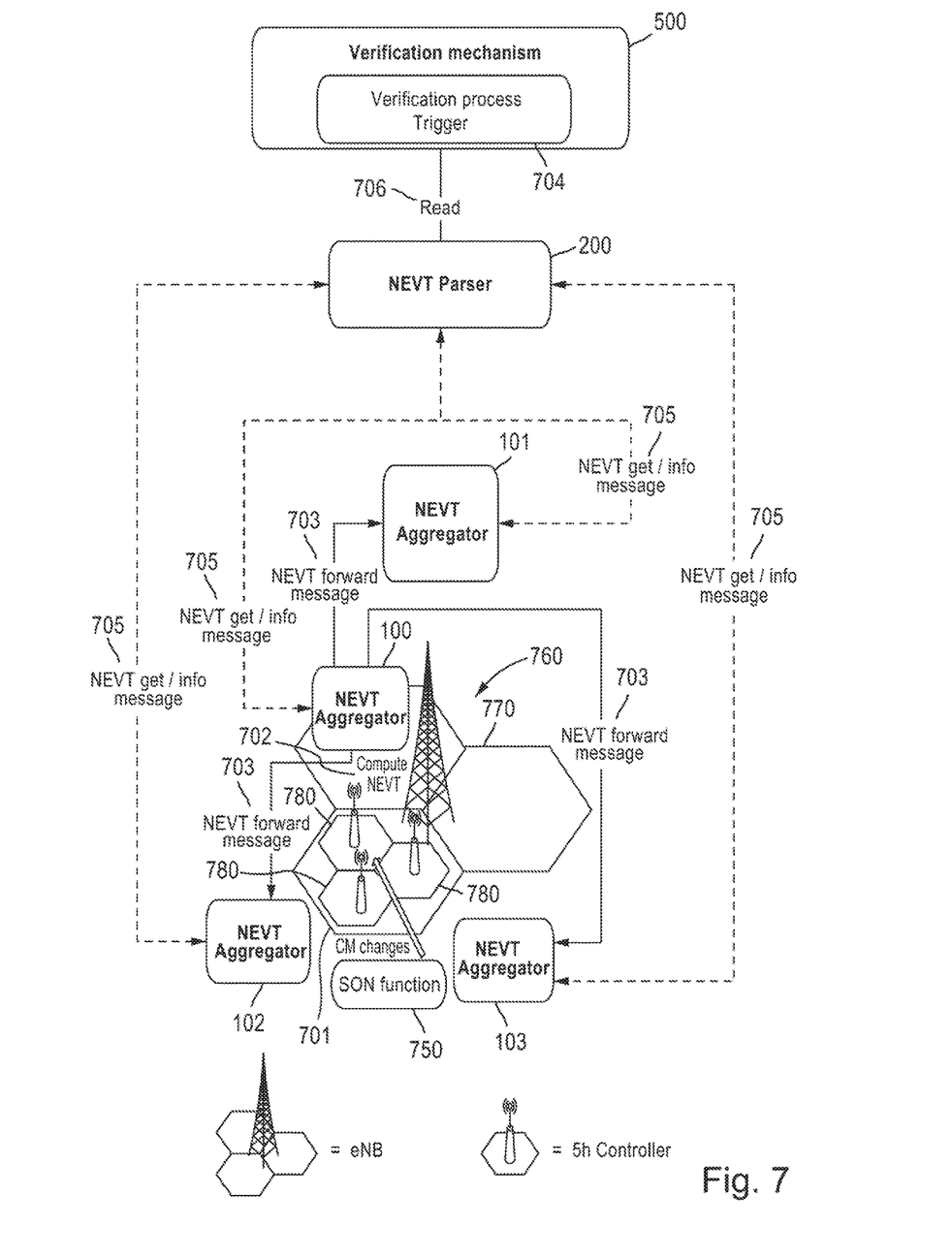
FIG. 7 an example for message flows.

FIG. 7 illustrates an exemplary message flow comprising the following features:

701: A SON function 750 may trigger some CM changes within a verification area, for example in a 5G network 760. The network 760 itself may comprise an eNB 770 and three 5G controllers 780, as illustrated in an exemplary embodiment in FIG. 7.

702: After the change, the responsible NEVT aggregator 100 may compute the NEVT of the affected NE.

703: The same NEVT aggregator 100 may distribute the computed value to the neighboring NEs, including those being part of a 4G network, by generating NEVT forward messages. The addressed NEVT aggregators 101, 102, 103 may receive the message and may adapt the temperature respectively. The receiving NEVT aggregators 101, 102, 103 may dynamically configure the temperature, based on the temperature of the sending NEVT aggregator 100, as well as the cooling factor.

704: When the verification mechanism is triggered, the verification mechanism may use the NEVT parser 200 to evaluate the temperature of the given verification area.

705: The NEVT parser 200 may collect the NEVTs of the NEs by issuing a NEVT get message. The corresponding NEVT aggregators 100, 101, 102, 103 may reply with an NEVT info message.

706: Based on the gathered information the verification mechanism may be able to set an observation window length and may determine whether to start the verification process. For the third observation window 686, as shown in FIG. 6, the decision may be to start the process and to generate an undo request at the end.

Exemplary embodiments may be summarized as follows:

SON functions may require not only one step, but several steps and may, therefore, get interrupted as they try to achieve their goal. This problem may be solved as the NEVT concept dynamically expands the observation window which allows a verification mechanism to reserve more time to assess the performance of a verification area.

Using a fixed observation window may force a verification mechanism to take a decision to deploy an undo too early. However, the utilization of the NEVT concept may allow the dynamic adaptation of the observation window.

A verification area, i.e., a set of NEs, may not reach a global performance optimum if there is a fixed observation window. However, the concept of NEVT, i.e., marking NEs as "hot" or "cold", gives a verification mechanism a hint which areas to immediately rollback and which to possibly further investigate. Hot areas, i.e., a set of hot NEs, are more likely to accept intermediate optimization steps that lead to reduced performance, in order to reach improved performance in the future. Cold areas, i.e., a set of cold NEs, are considered as mature and are evaluated by the verification process.

In a large and dense network with frequent CM changes, verifying each change individually may lead to overlapping verification areas and in the worst case even to verification collisions. The concept of NEVT may allow a verification mechanism to omit verification areas that are considered as hot, and therefore, prevent a high amount of such areas from entering the verification process.

Locking down a verification area for observation may violate the requirement for availability, reliability, and efficiency in the upcoming 5G release. Blocking a verification area for any optimization tasks may no longer be required due to the NEVT concept and the ability to dynamically adapt the observation window. The ability to distribute heat information among the NEs may allow to dynamically adapt the observation area.

A large number of verification collisions may lead a large number of verification areas to be united, which as a consequence means that there is a potential for a rollback involving a high amount of NEs. The NEVTs may provide to a verification mechanism a hint which areas to omit verification areas, i.e., those that are hot, and which to consider by the verification process, i.e., those that are cold.

Figure 8:
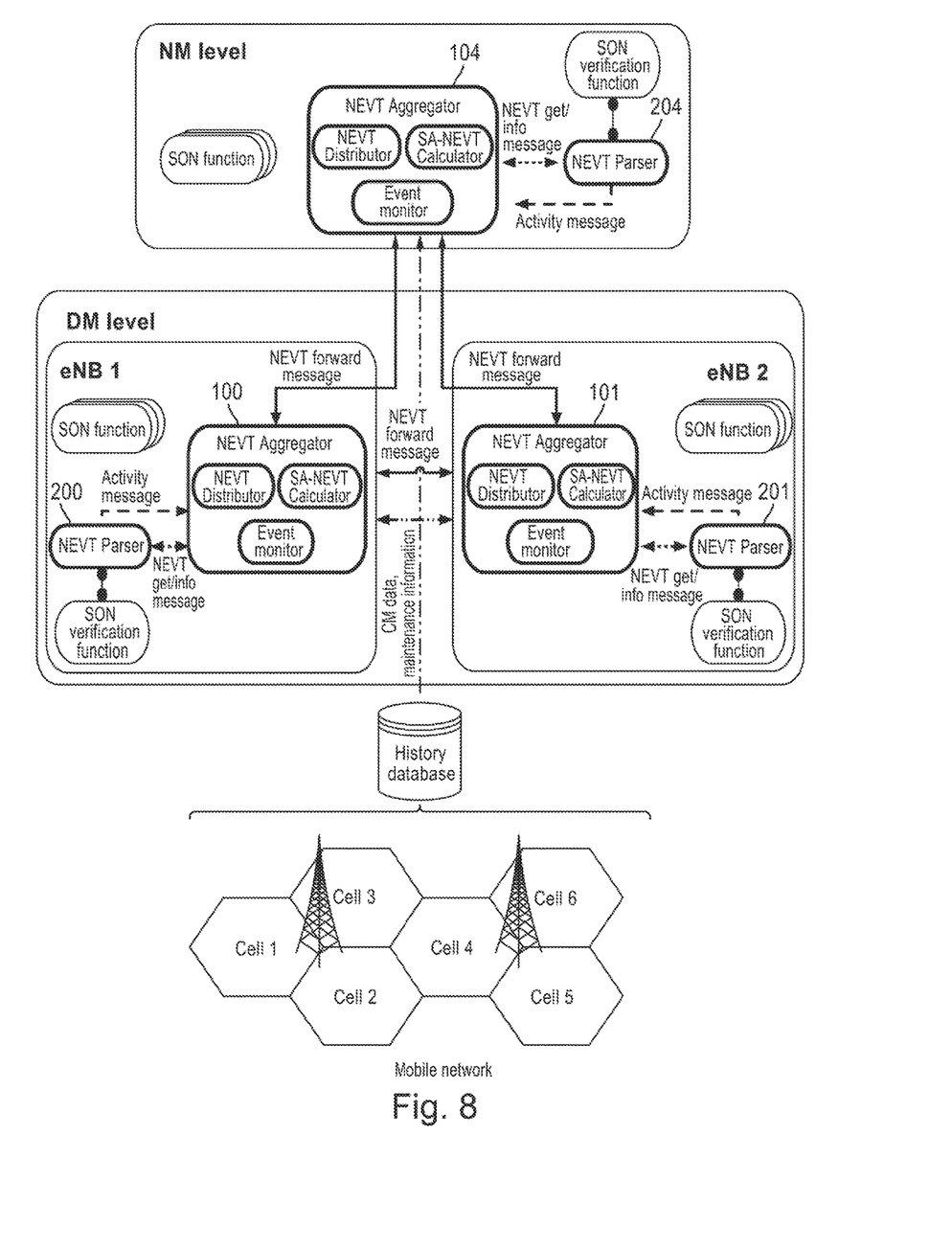
FIG. 8 an example for location and interfaces in a LTE setup.
Figure 9:
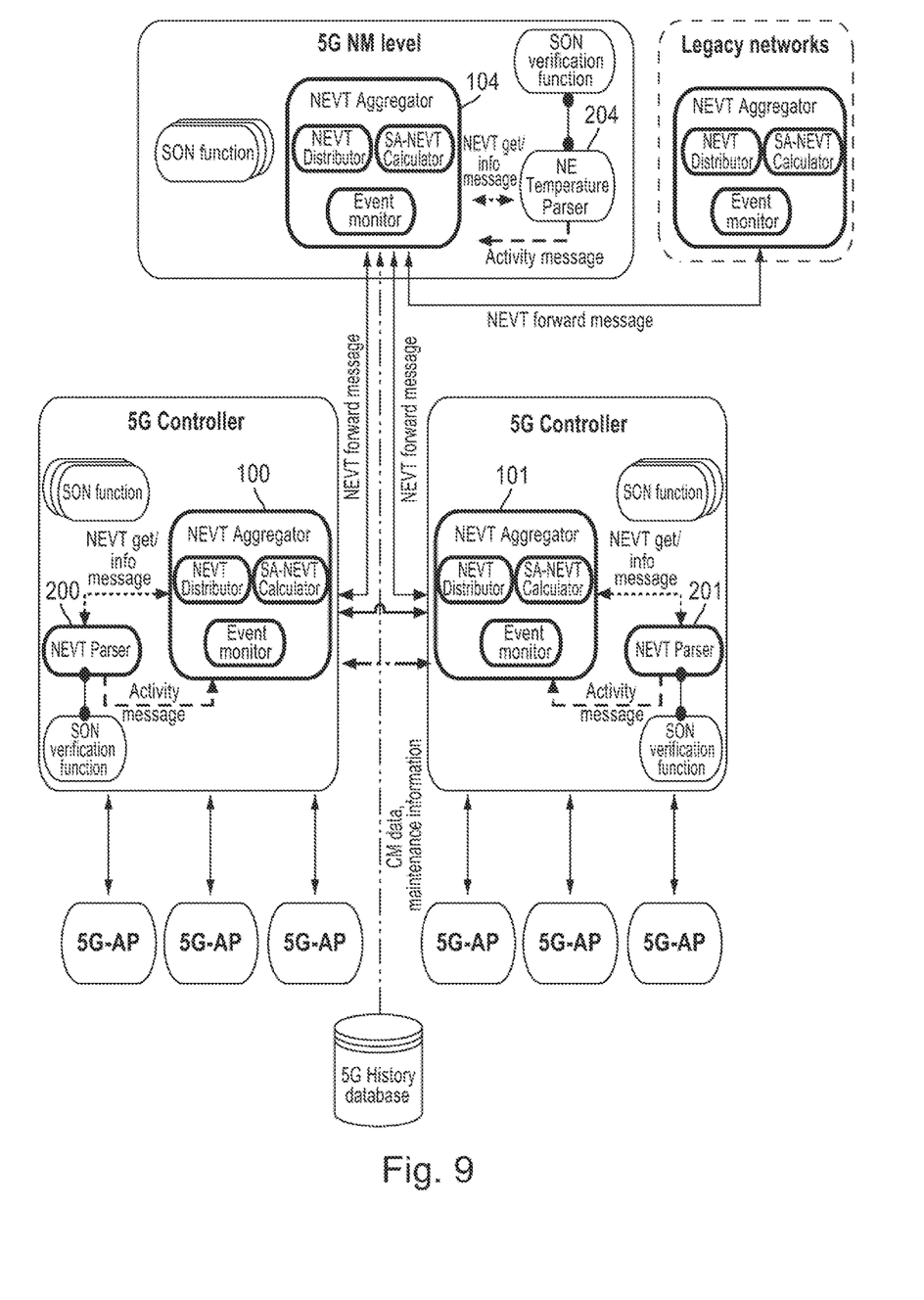
FIG. 9 an example for location and interfaces in a 5G setup.
Figure 10:
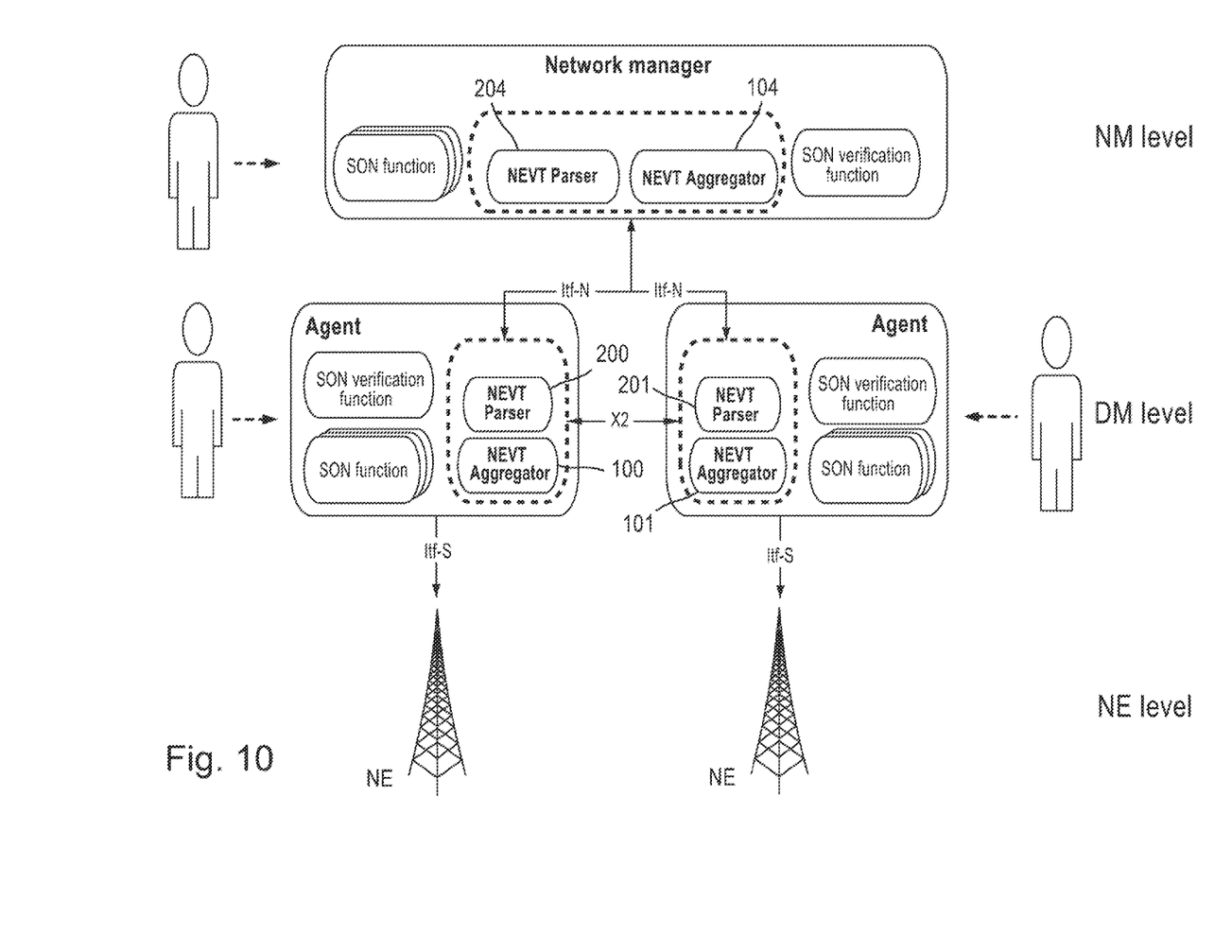
FIG. 10 an example with interfaces in an overview.

FIG. 8, FIG. 9 and FIG. 10 are illustrating exemplary embodiments of different networks comprising different levels, messages and interfaces.

LTE Technology

FIG. 8 shows an exemplary embodiment of the invention in an LTE network. In this exemplary embodiment NEVT aggregators 100, 101 are implemented as part of an Evolved Node B (eNB) in a DM level, respectively, which can be accessed via 3GPP 32-series Northbound Interface (Itf-N), which is a 3GPP standard interface. The presented implementation makes use of Simulated Annealing (SA), as indicated by an NEVT calculator or especially a SA-NEVT calculator. In SA variable temperature variable may be kept to simulate this heating process. Initially the variable is set high and then allowed to slowly cool as the algorithm runs. While this temperature variable is high, the computing mechanisms or algorithm may be allowed to more frequently accept solutions that are worse than our current solution. This gives the computing mechanism or an algorithm the ability to jump out of any local optimums in order to reach the global performance optimum. As the temperature is reduced, so is the chance of accepting worse solutions. Therefore, the computing mechanism or an algorithm may be allowed to gradually focus on an area of the search space in which a close to optimum solution can be found. This gradual cooling process is what may make the computing mechanism or an algorithm effective at finding a close to optimum solution when dealing with large data sets which contain numerous local optimums.

Moreover, FIG. 8 illustrates an exemplary embodiment where a major change within cell 3 is made. As a result, the NEVT aggregator 100 decides to add heat to cell 3 via Itf-N to indicate configuration changes that the network needs to adapt to. The NEVT aggregator can, for example, provision and activate a plan with a heat parameter indicating the heat to be added to cell 3. This is processed by eNB 1, which forwards the heat parameter to the NEVT aggregator 100.

The NEVT aggregator 100 adds the additional heat to cell 3 and then goes to see the neighbors of cell 3. The NEVT aggregator 100 determines that cells 1, 2 and 4 are its neighbors. Since cells 1 and 2 are managed by the same NEVT aggregator 100, the NEVT aggregator 100 itself adds the transmitted heat into the temperature of cells 1 and cell 2. The NEVT aggregator 100 also determines that cell 4 is managed by eNB 2. Afterwards, the NEVT aggregator 100 sends a message over the X2 interface (or similar) to eNB 2 indicating the amount of heat received by cell 3 and its current temperature. When receiving the message, the NEVT aggregator 101 in eNB 2 can decide, what the NEVT aggregator 101 in eNB 2 does with the information, i.e., how much the NEVT aggregator 101 in eNB2 will raise the temperature of cell 4. Moreover, in an NM level a further NEVT aggregator 104 together wir a NEVT parser 204 is installed.

5G Technology and Beyond

In a similar manner, as described above for current LTE networks of FIG. 8, the suggested solution can be implemented in the future 5G networks. As illustrated in FIG. 9, NEVT aggregators could be implemented as part of a 5G controller, may be responsible for a set of 5G Access Points (5G-AP). The messages may be exchanged over the X2* interface, as indicated in FIG. 9.

FIG. 10 illustrates an example with interfaces connecting different levels within a network. These levels are NM level (Network Management level), DM level (Domain Management level) and NE level (Network Element level). The interfaces are Ift-N, X2, Ift-S.

Overall, SON verification may give sufficient freedom for SON functions to adapt to their environment, when necessary. It addition, it may ensure that the system converges to a stable, well-performing state. SON verification achieves this goal by dynamically adjusting the length of the observation window, based on the NE life-cycle and state of stability, i.e., the temperatures of the corresponding NEs. Furthermore, SON verification may utilize the NEVT to decide how to group, prioritize and time verification operations. This may aim in reducing the verification load in an environment with frequent CM undo actions. The present invention provides a robust deployment of undo requests and robust verification in modern mobile networks. Moreover, the present invention is independent on the network layer.

Further, in the same way or similar way as a verification mechanism has access to the temperature to the NEs, other SON functions may utilize the NEVT concept in their optimization algorithms as well. Based on the read temperature information, they can improve their decisions.

Moreover, the present invention is compatible with current standards, such as 4G technology. In addition the present invention is compatible with future standards, e.g., the standards included in the upcoming 5G technology and may be implemented as a 5G standard. In addition, a heterogeneous 4G/5G environment may consist of both Virtual Network Functions (VNFs) and Physical Network Functions (PNFs) in core and local clouds. Due to its need of accessing KPIs from a wide scope of NEs, a verification mechanism and its NEVT parser may be implemented in the core cloud. Furthermore, a centralized implementation of the NEVT aggregator, implementing the aggregation for several VNFs, may be located in the local cloud. Such a centralized implementation reduces the signaling required for the distribution of the heat. Additionally, in case of VNFs, the information coming from VNF Manager (VNFM) via Element Management System (EMS) regarding e.g., function scale out or scale in decisions, can be utilized in the NEVT calculation.

Overall, there may be provided a Network Element Life-Cycle Aware Method for Verifying Configuration Changes in 4G/5G Ultra Dense Networks. If desired, the different functions and illustrated blocks discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted that while the above describes example embodiments of the invention, these descriptions should not be viewed in a limiting sense. Rather, there are several variations and modifications which may be made without departing from the scope of the present invention, as defined in the appended claims.

LIST OF ABBREVIATIONS

The following abbreviations that may be found in the specification and/or the drawing figures are defined as follows:
4G Fourth generation of mobile communications
5G Fifth generation of mobile communications
AP Access Point
BS Base Station
CCO Coverage and Capacity Optimization
CM Configuration Management
CVT Cell Virtual Temperature
DM Domain Management
EMS Element Management System
eNB Evolved Node B
FM Fault Management
Itf-N 3GPP 32-series Interface-N
LTE Long Term Evolution
NE Network Element
NEVT Network Element Virtual Temperature
NGMN Next Generation Mobile Networks
NM Network Management
MRO Mobility Robustness Optimization
KPI Key Performance Indicator
PM Performance Management
PNF Physical Network Function
SA Simulated Annealing
SON Self-Organizing Network VNF Virtual Network Function
VNFM VNF Manager

The invention claimed is:

1. A method for verifying configuration changes in a Self-Organizing Network comprising a plurality of verification areas, in which each verification areas at least one network element is installed, the method comprising:
observing a configuration change within a verification area affecting one or more network elements;
computing a virtual temperature value for the affected network elements, wherein the virtual temperature value indicates a stability state of the network element, and wherein the stability state of the network element corresponds to a likelihood of the network element to accept or reject optimization steps to reduce current performance and improve future performance of the network element;
distributing the computed virtual temperature value;
receiving the computed virtual temperature value;
triggering a verification mechanism; and
evaluating the virtual temperature value of the given verification area.

2. The method according to claim 1, further comprising:
providing a decision based on the evaluated virtual temperature value.

3. The method according to claim 2, wherein the decision based on the evaluated virtual temperature value is one decision out of the following group of decisions comprising to accept the verified changes, to reject the changes and to continue monitoring.

4. The method according to claim 1, wherein
wherein distributing the computed virtual temperature value comprises to providing a forward message.

5. The method according to claim 1, wherein
evaluating the virtual temperature value of the given verification area comprises exchanging information by issuing a get message and replying with an info message.

6. A network component to be installed in a Self-Organizing Network, said network component comprising:
one or more memories storing computer program code; and
one or more processors upon executing the program code, perform the following:
observing a configuration change within a verification area affecting one or more network elements;
computing a virtual temperature value for the affected network elements, wherein the virtual temperature value indicates a stability state of the network element, and wherein the stability state of the network element corresponds to a likelihood of the network element to accept or reject optimization steps to reduce current performance and improve future performance of the network element;
distributing the computed virtual temperature value; and
evaluating the virtual temperature value of the given verification area.

7. The network component according to claim 6, wherein the one or more memories storing additional program code that when executed by the one or more processors, further performs the following:
monitoring the observation change as an event;
computing a virtual temperature value for the affected network elements; and
distributing information relating to the calculated virtual temperature value.

8. The network component according to claim 6, wherein distributing the computed virtual temperature value comprises distributing the computed virtual temperature value to one or more further network components comprising at least the same characteristics as the network component.

9. The network component according to claim 6, wherein the one or more memories storing additional program code that when executed by the one or more processors, further performs the following:
receiving and sending forward messages.

10. The network component according to claim 6, wherein the one or more memories storing additional program code that when executed by the one or more processors, further performs the following:
retrieve information from a history database.

11. A network component comprising:
one or more memories storing computer program code; and
one or more processors upon executing the program code, perform the following:
receiving a computed virtual temperature value; and
triggering a verification mechanism,
wherein the computed virtual temperature value indicates a stability state of a network element, and wherein the stability state of the network element corresponds to a likelihood of the network element to accept or reject optimization steps to reduce current performance and improve future performance of the network element.

12. The network component according to claim 11, wherein the one or more memories storing additional program code that when executed by the one or more processors, further performs the following:
requesting information from a further network component by sending a get message.

13. The network component according to claim 11, wherein the one or more memories storing additional program code that when executed by the one or more processors, further performs the following:
allowing a verification mechanism to read a current virtual temperature value.

14. A Self-Organizing Network, comprising:
a first network component; and
a second network component,
the first network component comprises
one or more first memories storing program code, and
one or more first processors upon executing the program code, perform the following:
observing a configuration change within a verification area affecting one or more network elements;
computing a virtual temperature value for the affected network elements, wherein the virtual temperature value indicates a stability state of the network element, and wherein the stability state of the network element corresponds to a likelihood of the network element to accept or reject optimization steps to reduce current performance and improve future performance of the network element;
distributing the computed virtual temperature value; and
evaluating the virtual temperature value of the given verification area, and
wherein the second network component comprises
one or more second memories storing program code, and one or more second processors upon executing the program code stored in the one or more second memories, perform the following:
receiving and sending forward messages.

15. The Self-Organizing Network according to claim 14, wherein the one or more second memories of the second network component storing additional program code that when executed by the one or more second processors, further performs the following:
send an activity message to the first network component; and
send a get message to the first network component, and wherein the one or more first memories of the first network component storing additional program code that when executed by the one or more first processors, further performs the following:
send an info message to the second network component.

\* \* \* \* \*